United States Patent [19]

Jeffery et al.

[11] Patent Number: 4,555,219
[45] Date of Patent: Nov. 26, 1985

[54] HUB-MOUNTED ACTUATORS FOR BLADE PITCH COLLECTIVE CONTROL

[75] Inventors: Philip A. E. Jeffery, Trumbull; Greg R. Luecke, New Haven, both of Conn.

[73] Assignee: United Technologies Corporation, Hartford, Conn.

[21] Appl. No.: 644,001

[22] Filed: Aug. 23, 1984

[51] Int. Cl.⁴ ............................................. B64C 27/76
[52] U.S. Cl. .................................. 416/158; 416/155; 416/168 R
[58] Field of Search ............... 416/114, 158, 168 R, 416/155, 106, 107, 115

[56] References Cited

U.S. PATENT DOCUMENTS

| | | | |
|---|---|---|---|
| 1,870,928 | 8/1932 | Smith | 416/141 X |
| 2,427,939 | 9/1947 | Woods | 416/158 X |
| 2,593,335 | 4/1952 | Neale | 416/140 A X |
| 2,606,621 | 8/1952 | Neale | 416/158 X |
| 2,659,550 | 11/1953 | Peterson | 416/155 X |
| 2,720,272 | 10/1955 | Prince | 416/155 X |
| 3,227,220 | 1/1966 | You | 416/164 X |
| 3,384,184 | 5/1968 | Schramm | 416/102 |
| 3,393,750 | 7/1968 | You | 416/158 X |
| 3,684,398 | 8/1972 | Davidson et al. | 416/155 X |
| 4,379,678 | 4/1983 | Carlock et al. | 416/158 X |

FOREIGN PATENT DOCUMENTS

| | | | |
|---|---|---|---|
| 566758 | 4/1958 | Belgium | 416/168 |
| 577968 | 6/1959 | Canada | 416/158 |
| 357245 | 9/1931 | United Kingdom | 416/155 |
| 605561 | 7/1948 | United Kingdom | 416/158 |

Primary Examiner—Everette A. Powell, Jr.
Attorney, Agent, or Firm—Gerald E. Linden

[57] ABSTRACT

Blade collective pitch control is provided for a rotor system by rotary actuators located between adjacent blades. Each actuator is connected to the leading edge of one adjacent blade and the trailing edge of the other adjacent blade.

5 Claims, 5 Drawing Figures

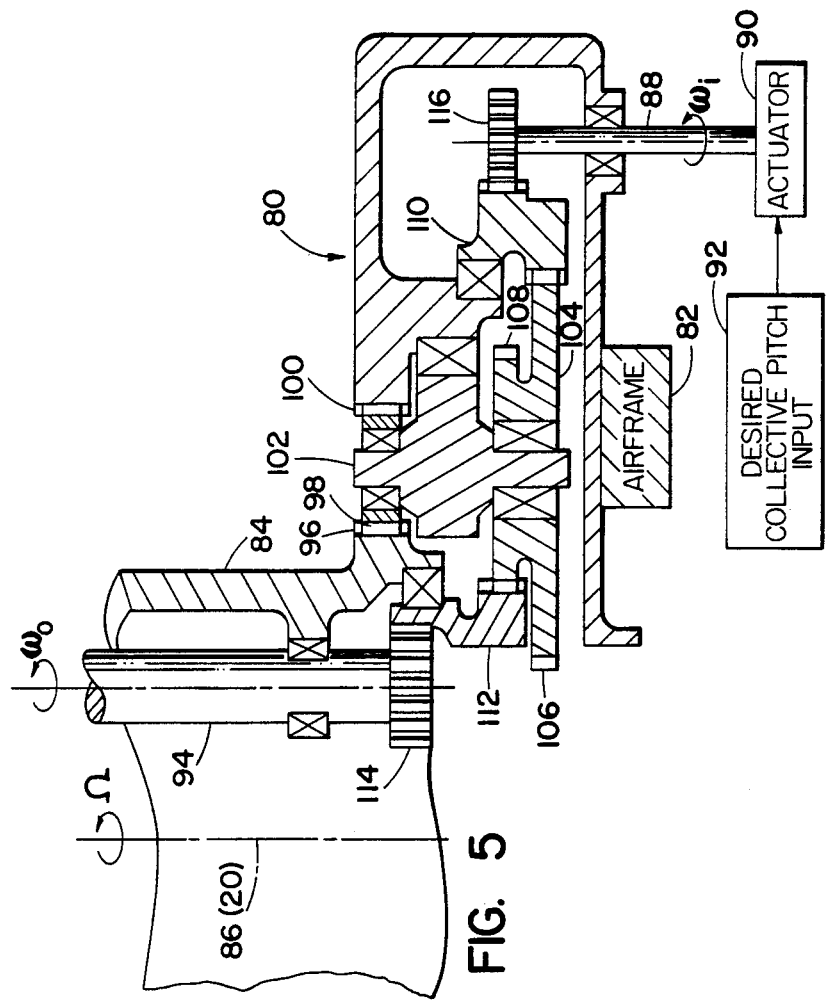

HUB-MOUNTED ACTUATORS FOR BLADE PITCH COLLECTIVE CONTROL

The government has rights in this invention under NASA Contract No. NAS2-11058.

DESCRIPTION

1. Technical Field

The invention relates to collective blade pitch control in a rotor system, such as the main rotor of an X-Wing helicopter.

2. Background of the Invention

Pitch change mechanisms for helicopter main rotor blades are known comprising a swashplate that is responsive to control inputs from a pilot or an automatic flight control system (AFCS) and that is coupled to a single pitch horn on each blade to effect aerodynamic control over the aircraft through cyclic and collective blade pitch changes. A drawback to the single pitch horn is that pitch inputs can couple to flap if the linkage between the swashplate and a blade fails, control over the pitch of that blade is lost.

An X-wing rotor/wing is a four-bladed, very stiff bearingless rotor which achieves cyclic and collective thrust modulation through circulation control, implemented by programmed blowing of compressed air through rotor blade leading and trailing edge slots. However, performance and handling quality analyses of the X-wing rotor have shown that a mechanical collective pitch control system is required to supplement the thrust modulation of the rotor during various flight regimes, specifically hover and high speed fixed wing flight. The implementation of a conventional mechanical collective pitch control system on an X-wing rotor would involve long load paths through the control linkages, thus adding undesirable material weight in order to achieve satisfactory system stiffness. In addition, conventional systems can only be used if the blade root is firmly supported against vertical deflection, and it would be difficult to allow blade lead-lag motion without coupling to the blade pitch motion. Further, it would be difficult to stiffen the open blade section to allow the attachment of a single horn arm.

DISCLOSURE OF THE INVENTION

Therefore, it is an object of this invention to provide for simple and effective mechanical collective pitch control in a rotor system, without coupling to lead-lag or flap. It is another object to provide for short load paths through the control linkages and to firmly support the blade root against vertical deflection. In the context of an X-wing aircraft, it is an object of this invention to supplement the collective thrust modulation with a mechanical collective while cyclic pitch remains under circulation control.

According to the invention, rotary actuators are located between adjacent blades in a rotor system. Each actuator moves the leading edge of one adjacent blade in a pitch increasing or decreasing direction and moves the trailing edge of the other adjacent blade to effect a corresponding pitch change therein. It should be understood that the terms "leading edge" and "trailing edge" as used herein are used in the context of the X-wing rotor/wing rotating. When stopped in high speed flight, airflow over half of the blades is reversed.

According further to the invention, inputs to the actuators are via a torqueshaft that is within and rotates with the rotorshaft, but which is driven by a compensating gearbox that negates the effect of rotorshaft rotation.

According further to the invention, two (redundant) torqueshafts are provided—each for half of the actuators—and the inputs of the actuators are interconnected for redundancy.

Other objects, features and advantages of this invention will become apparent in light of the description contained herein of various aspects and embodiments of the invention.

BRIEF DESCRIPTION OF THE DRAWINGS

FIG. 5 is a cross-sectional view of a compensating gearbox which can be used in conjunction with the invention.

BEST MODE FOR CARRYING OUT THEE INVENTION

Figure 1:
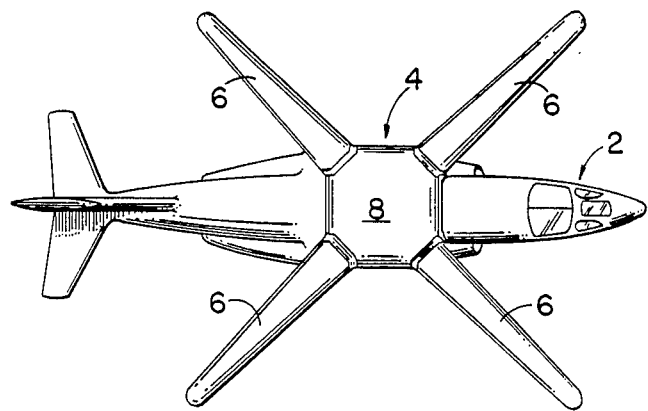
FIG. 1 is a top view of an X-wing aircraft.

FIG. 1 shows an X-wing aircraft 2 having a rotor 4 including four blades 6 and 8. The blades 6 are circulation controlled airfoils, each having leading edge and trailing edge slots through which compressed air from a pneumatic system is ejected. Control is obtained by cyclically and collectively modulating the amount of ejected airflow. In certain flight regimes, such as landing and takeoff, the rotor system rotates; and in other flight regimes, such as forward flight, the rotor system is stationary and is locked in the position shown.

Figure 2:
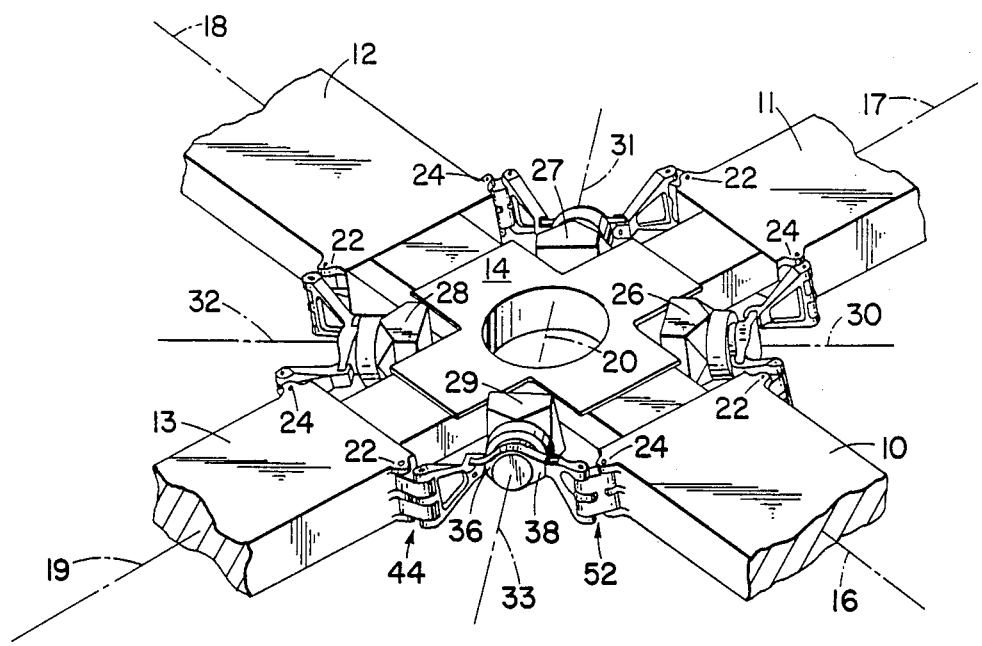
FIG. 2 is a perspective view of the rotor system of this invention, showing the relationship of the rotary actuators to the blades.

In FIG. 2 is shown a cross beam rotor system, similar to those disclosed in U.S. Pat. No. 4,299,538 (Ferris, 1983), entitled CROSS BEAM ROTOR, and No. 4,093,400 (Rybicki, 1978), entitled CROSS BEAM ROTOR. Four blades 10-13 are attached at their root ends to a hub 14, which in this example is the central portion of a cross beam, in a suitable manner that allows for rotation of each blade about a respective blade pitch axis 16-19. For purposes of this discussion, the pitch axes 16-19 are considered to be coplanar, in a rotor plane that is normal to a rotorshaft axis 20. At the root end, each blade has a pitch horn 22 on the leading edge and a pitch horn 24 on the trailing edge. This is a notable difference between the rotor system of the present invention and the cross beam rotors of the aforementioned U.S. patents which have only one pitch horn per blade. With a single pitch horn per blade, pitch change inputs result not only in blade pitch changes (torsion), but also in a slight flapwise deflection of the blade due to the flexibility of the cross beam. In other words, pitch inputs do not result in pure torsion, but couple to flap. As will be evident, the actuator system of this invention provides pure torsion in response to pitch inputs.

Four rotary actuators 26-29 are symmetrically disposed between the blades 10-13 so that the axes of rotation 30-33 of their output shafts 34 are in the rotor plane and bisect the pitch axes 16-19. Details of the connections between the actuators 26-29 and the blades 10-13 are best viewed in FIG. 3 which is a top view of the rotor system of FIG. 1.

The output shaft 34 of each actuator 26–29 has two diametrically opposed arms 36 and 38 that, for netural blade pitch, lie in the rotor plane. (For purposes of this description, neutral blade pitch means that the blade chords are in the rotor plane.) The arm 36 is attached via a ball joint 40 to one member 42 of a hinged (two-part pivoted) linkage 44, the other member 46 of which is pivotally attached to the leading edge pitch horn 22 of one adjacent blade. The arm 38 is similarly attached via a ball joint 48 to one member 50 of a hinged (two-part pivoted) linkage 52, the other member 54 of which is pivotally attached to the trailing edge pitch horn 24 of the other adjacent blade. The axes of the pivots between the linkages 44 and 52 and the respective pitch horns 22 and 24, and the pivots in the linkages 44 and 52 themselves, are all normal to the rotor plane to allow for lead-lag motion of the blades without coupling to pitch.

Figure 3:
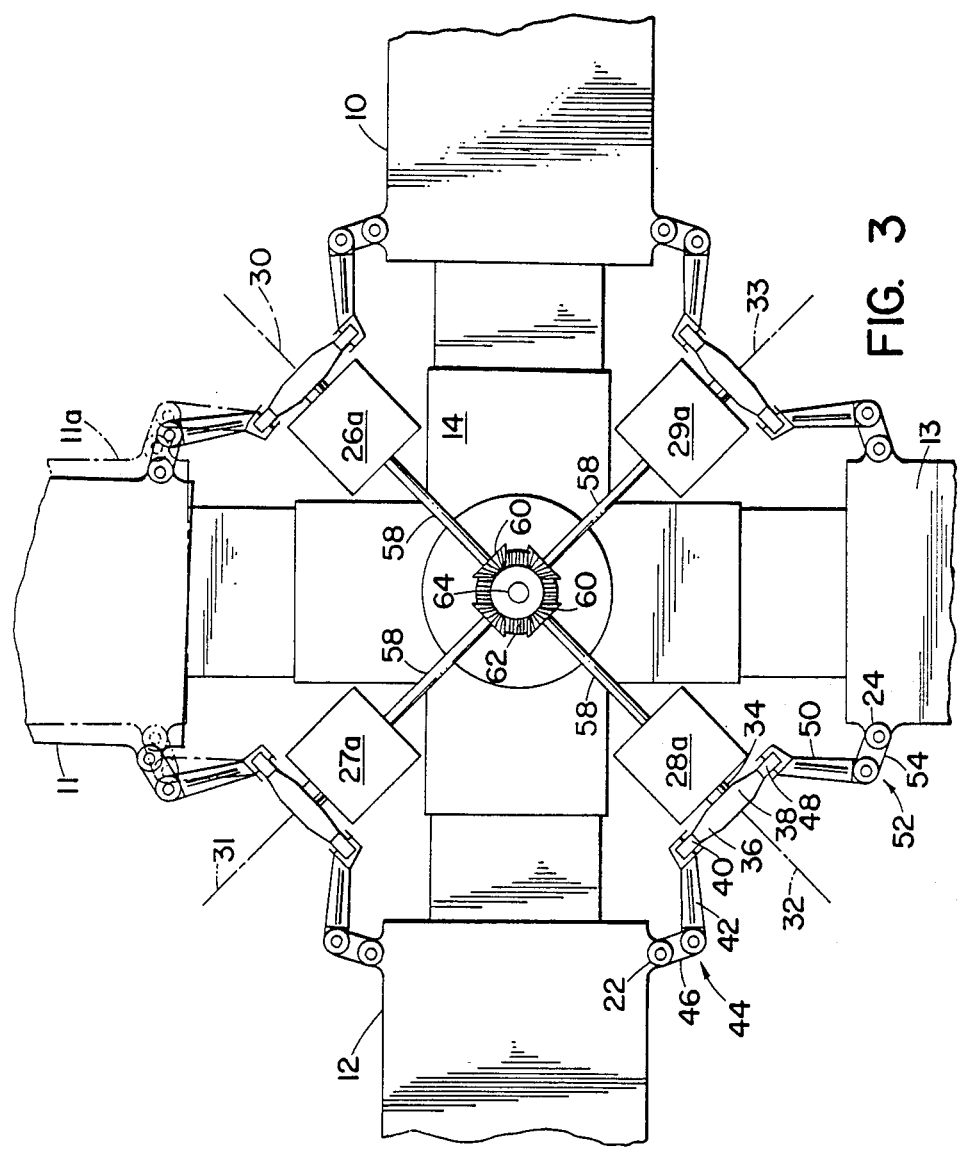
FIG. 3 is a top view of the rotor system of FIG. 1 showing the input to the actuators.

The blade 11 is shown in a lead position, its neutral lead-lag position being indicated by broken lines in FIG. 3, to illustrate the accommodation of lead-lag motion by the actuator system of this invention.

Each actuator causes a corresponding pitch change in two adjacent blades. Consider the following example. As the output shaft 34 of the actuator 29 rotates clockwise, as indicated by an arrow 56, (see FIG. 2) the arm 38, and hence the trailing edge of the blade 10, are rotated below the rotor plane. This increases the pitch of the blade 10. Meanwhile, the arm 36, and hence the leading edge of the blade 13 are rotated above the rotor plane, thereby increasing the pitch of the blade 13. The pitch increase of the blades 10 and 13 correspond to one another. This provides for collective control in the X-wing rotating mode. When the rotor stops in high speed flight, the mechanism described herein provides roll control.

Conversely, each blade is acted upon by two actuators. Therefore, the actuators 26–29 are driven in unison so that the pitch changes caused by each are equal.

An example of an actuator drive system is shown in FIG. 3. Each actuator 26a–29a (corresponding to the actuators 26–29 of FIG. 1) is responsive to an actuator inut via an input shaft 58 that terminates in a bevel gear 60. The gears 60 are driven by a mating gear 62 which is on the top end of a torqueshaft 64 that is coaxial with the rotorshaft. Therefore, when the torqueshaft 64 turns, all of the actuators 26–29 respond equally. The input shafts 58 may pass through (via a suitable hole) or above (with suitable clearance) the cross beam 14. As explained in further detail hereinafter, the torqueshaft 64 is driven by a compensating gearbox so that actuator motion is independent of rotorshaft rotation and speed.

Two actuators acting in unison upon each blade provide certain advantages. For instance—for an increase in blade pitch, one actuator rotates the leading edge of the blade above the rotor plane while another actuator rotates the trailing edge of the blade below the rotor plane. Therefore, pure torsion is applied to the blade for pitch changes so that there will be no tendency to couple with flapping motion. Also the system is fault tolerant. Consider the failure of an actuator. So long as the failed actuator is passive (i.e., not locked up), the other actuator for the blade maintains control over pitch. In fact, one could envision the loss of up to three-out-of-four actuators and the maintenance of control by the remaining actuator. Also, the short load path between the actuators and associated blades provides a very stiff control system which supports the blades at the root end without the need for feathering bearings and provides blade restraint against vertical shear forces. However, if no feathering bearing is provided the fault tolerance described previously is not operative. In order to provide this fault tolerance, feathering bearings that are soft or have slop may be installed. The primary vertical support load path remains through the actuator linkage as described.

Figure 4:
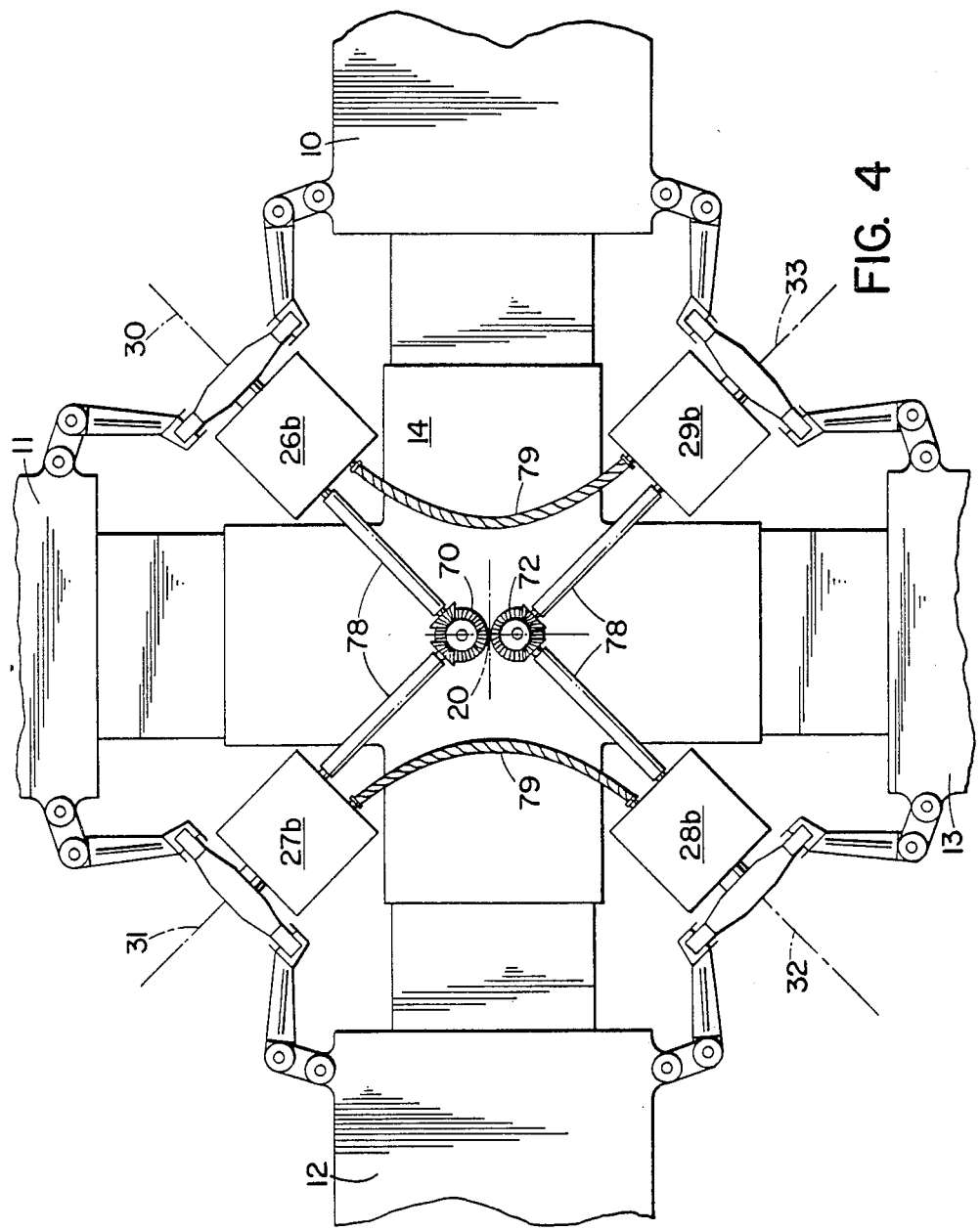
FIG. 4 is another top view of the rotor system of FIG. 1, showing an alternate embodiment of the actuator input.

FIG. 4 discloses an alternate embodiment of the actuator system of this invention wherein two (redundant) torqueshafts 70 and 72 are provided, either of which is capable of providing full control, rather than the single torqueshaft 64 of the previous example. The torqueshafts 70 and 72 are offset from the rotor axis. Four actuators 26b–29b (corresponding to the actuators 26–29 of FIG. 1) are provided on the hub 14 between the four blades 10–13. Each actuator has two (redundant) inputs, rather than only one, either of which are capable of providing full control.

Each torqueshaft drives only half of the actuators—in this case, two. The torqueshaft 70 drives the actuators 26b and 27b via input shafts 78 to one of their redundant inputs. Similarly, the torqueshaft 72 drives the actuators 28b and 29b via input shafts 78 to one of their redundant inputs. The offsets of the input shafts 78 from the output drives axes (30–33) are not critical to the operation of the system, but nicely accommodate the offsets of the torqueshafts 70 and 72 without causing the input shafts 78 to be driven at an angle.

Flexible drives, such as cables 79 connect to other inputs of the actuators 26b–29b together in a manner that provides for maximum fault-tolerance. The inputs of the actuators 26b and 29b are connected together and the inputs of the actuators 27b and 28b are connected together. Consider the failure of the torqueshaft 70. So long as the failure is passive (i.e., not a seizure) the actuator 26b would drive the actuator 27b, thereby maintaining full control.

The actuators 26–29, 26a–29a, and 26b–29b are essentially simple redution gearboxes. The particular reduction ratio of the actuators and the mechanical advantage of the arms and links depends upon overall design configurations, but is well within the grasp of one skilled in the art in light of the teaching contained herein.

An example of how the torqueshaft(s) are driven independently of the rotor is shown in FIG. 5. A compensating gearbox 80 is stationary with respect to an airframe 82, and a rotorshaft 84 rotates with respect thereto, at a rate ($\Omega$), about a rotor axis 86. The input to the gearbox 80 is a shaft 88 that is rotated at an angular rate ($\omega_i$) by a suitable actuator 90 in response to a desired collective pitch input 92 from a pilot or AFCS. The output of the gearbox 80 is a torqueshaft 94 such as one of those (70, 72) described with reference to FIG. 3. The gearbox 80 transfers motion from the input shaft 88, relative to the airframe 82, to the output shaft 94, relative to the rotor shaft 84, according to a fixed ratio. This is accomplished in the following manner.

A 160-tooth ring gear 96 is fixed to the rotorshaft 84 and meshes with a 28-tooth spur gear 98 that is also in engagement with a 216-tooth ring gear 100 which is fixed to the gearbox 80. Thus, when the rotorshaft 84 rotates, the gear 98 orbits the rotor axis 86 as well as turning about its own axis. A ring 102 is journaled to the gear 98 so that it is driven thereby to rotate about the rotor axis 86.

The rotation of the ring 102 about the rotor axis 86 drives a gear 104 that is journaled thereto to orbit about the rotor axis 86. The gear 104 is two coaxial, joined spur gears—a 100-tooth gear 106 and a 60-tooth gear 108. The gear 106 engages a ring gear 110 at its 288-tooth inner diameter. The ring gear 110 is stationary with respect to the airframe 82 for no input at the input shaft 88. Therefore, the orbiting of the gear 104 causes rotation of the gear 104 about its own axis.

A ring gear 112 is free to rotate about the rotor axis 86 and is in mesh at its 128-tooth outside diameter with the gear 108, and at its 110-tooth inner diameter with a spur gear 114 at the end of the torqueshaft 94. This causes the torqueshaft 94 to rotate at the rotor speed relative to the airframe or, in other words, to be stationary with respect to the rotorshaft. Therefore, for no control input—when the input shaft 88 is not rotating relative to the airframe—there is no control output—the torqueshaft 94 is stationary with respect to the rotor.

For a control input, a 40-tooth spur gear 116 on the end of the input shaft 88, which meshes with the 330-tooth outer diameter of the ring gear 110, turns in response to the desired collective pitch input and causes rotation of the gears 104, 114, in addition to that previously discussed, so that the output rotation ($\omega_o$) bears a fixed relation to the input rotation ($\omega_i$). Rotational position and rate are used interchangeably in this context.

Although not specifically shown, it is contemplated that the actuators 26–29 could either of themselves, or via an intermediate hub-mounted transducer, be responsive to signals from an electrical or optical slipring rather than requiring the mechanical input described hereinbefore.

It should be understood that the number of blades is not limited to FOUR, although in the context of a cross beam rotor that is an appropriate number. It should also be understood that the invention is not limited to the main rotor of an X-wing aircraft and that other rotor systems, such as helicopter tail rotors, could benefit from the invention. Although the invention has been shown and described with respect to exemplary embodiments, various changes thereto and therein can be made without departing from the spirit and scope of the invention.

We claim:

1. A rotor system comprising:
    a rotorshaft that rotates relative to an airframe;
    a hub attached for rotation to the rotorshaft;
    blades attached to the hub in a manner to allow for blade pitch changes about respective blade pitch axes; and
    means for providing a desired collective pitch input to the rotor system;
    characterized by:
    actuators mounted to the hub between adjacent blades, each actuator attached to the leading edge of one adjacent blade and to the trailing edge of the other adjacent blade for causing a corresponding pitch change in the adjacent blades in response to an actuator input, wherein all of the actuators act in unison so that the blade pitch changes are collective; and
    means for providing the actuator input as a function of the desired collective pitch input.

2. A rotor system according to claim 1, characterized in that:
    each actuator has a rotary output shaft, the axis of which bisects the blade pitch axes of the adjacent blades; and
    each output shaft has two diametrically opposed arms, wherein one arm is attached to the leading edge of the one adjacent blade and the other arm is attached to the trailing edge of the other adjacent blade.

3. A rotor system according to claim 2, characterized in that:
    the one arm is attached to the leading edge of the one adjacent blade by a first hinged linkage;
    the other arm is attached to the trailing edge of the other adjacent blade by a second hinged linkage; and
    said first and second hinged linkages to allow for blade lead-lag motion without coupling to pitch.

4. A rotor system according to claim 1, characterized in that:
    each actuator has two redundant inputs, one of which is responsive to the actuator input, and the others of which are interconnected to provide for continued control in the event of the failure of an actuator to respond to the actuator input.

5. A rotor system according to claim 1, characterized in that the means for providing the actuator input is a compensating gearbox that comprises:
    an input shaft that is rotatable at a speed ($\omega_i$) relative to the airframe in response to the desired collective pitch input; and
    an output shaft that is rotatable at a speed ($\omega_o$) relative to the rotorshaft for providing the actuator input;
    wherein the output shaft speed ($\omega_o$) and the input shaft speed ($\omega_i$) bear a fixed relation to each other, independent of the rotorshaft speed.

* * * * *